(12) United States Patent
Shah

(10) Patent No.: US 7,169,852 B2
(45) Date of Patent: Jan. 30, 2007

(54) MOISTURE-REACTIVE HOT-MELT COMPOSITIONS

(75) Inventor: Pankaj Vinubhai Shah, Crystal Lake, IL (US)

(73) Assignee: Rohm and Haas Company, Philadelphia, PA (US)

( * ) Notice: Subject to any disclaimer, the term of this patent is extended or adjusted under 35 U.S.C. 154(b) by 77 days.

(21) Appl. No.: 10/986,750

(22) Filed: Nov. 12, 2004

(65) Prior Publication Data

US 2006/0106167 A1    May 18, 2006

(51) Int. Cl.
*C08G 18/10*    (2006.01)

(52) U.S. Cl. .................... 525/131; 428/423.1

(58) Field of Classification Search ........... 525/131; 428/423.1
See application file for complete search history.

(56) References Cited

U.S. PATENT DOCUMENTS 5,021,507 A    6/1991    Stanley 6,221,978 B1    4/2001    Li
2003/0010443 A1    1/2003    Rumack
2004/0249076 A1*   12/2004   Slark ..................... 525/123

FOREIGN PATENT DOCUMENTS

| EP | 0344912 | 9/1995 |
|---|---|---|
| WO | WO 98/20087 | 5/1998 |
| WO | WO 01/81495 | 11/2001 |
| WO | WO 04/111102 | 12/2004 |

\* cited by examiner

*Primary Examiner*—Rachel Gorr
(74) *Attorney, Agent, or Firm*—Carl P. Hemenway

(57) ABSTRACT

Provided are moisture-reactive hot-melt compositions and methods for making such moisture-reactive hot-melt compositions. The compositions are formed by a process comprising mixing ingredients comprising at least one polyol, at least one polyisocyanate, and at least one acrylic polymer. Also provided are composite constructions formed by a process comprising applying a film of such compositions to a first substrate and contacting at least one subsequent substrate to that film.

10 Claims, No Drawings

US 7,169,852 B2

MOISTURE-REACTIVE HOT-MELT COMPOSITIONS

BACKGROUND

Some moisture-reactive hot-melt compositions are useful for a variety of purposes, for example as adhesives. Hot melt compositions are often applied to a substrate to form a layer or coating, and the application is often performed using mechanical dispensing apparatus such as, for example, nozzles, extruders, roll coaters, etc. During such mechanical applications, it is common that some portion or portions of the apparatus is moving; for example, the substrate may be moving, or one or more nozzles may be moving, or a coating roll may be moving, or other parts may be moving, or any combination of portions of the apparatus may be moving. Usually, such motion has the effect that the point at which the hot-melt composition makes contact with the substrate is constantly being separated from the already-coated areas of the substrate. It is desirable that such separation occur without the occurrence of "cobwebbing" (i.e., the formation of strands of hot-melt composition forming in the air near the recently-coated portion of the substrate).

EP 0 344 912 B1 discloses non-hairing, moisture curable hot melt compositions comprising two or more of certain specific hydroxy-functional polymers.

It is desired to provide new alternative compositions that are moisture-reactive hot-melt compositions useful for a variety of purposes, including, for example, as adhesives that provide low cobwebbing.

STATEMENT OF THE INVENTION

In a first aspect of the present invention, there is provided a composition, wherein said composition is a moisture-reactive composition;

wherein said composition is a hot-melt composition; and wherein said composition is formed by a process comprising mixing ingredients comprising (a) 5% to 90% by weight at least one polyol, based on the weight of said composition;

(b) 1% to 20% by weight at least one non-reactive acrylic polymer having weight-average molecular weight of 40,000 or higher, based on the weight of said composition; and (c) 5% to 50% by weight at least one polyisocyanate, based on the weight of said composition.

In a second aspect of the present invention, there is provided a process comprising mixing ingredients comprising (a) 5% to 90% by weight at least one polyol, based on the weight of said composition;

(b) 1% to 20% by weight at least one non-reactive acrylic polymer having weight-average molecular weight of 40,000 or higher, based on the weight of said composition; and (c) 5% to 50% by weight at least one polyisocyanate, based on the weight of said composition.

wherein at least one product of said process is a moisture-reactive hot-melt composition.

In a third aspect of the present invention, there is provided a composite construction formed by a process comprising (I) applying a film of the composition of claim 1 to a first substrate, and (II) contacting at least one subsequent substrate to said film.

DETAILED DESCRIPTION

The composition of this invention is a moisture-reactive hot-melt composition. By "moisture-reactive" is meant herein that the composition contains isocyanate groups which are capable of reacting with water desirably to effect an increase in the molecular weight of the composition and/or effect crosslinking of the composition so as to increase the strength properties of the composition subsequent to being contacted with water. By "hot-melt" is meant herein that the composition which may be a solid, semi-solid, or viscous mass at room temperature (i.e., at 25° C. or below) can be advantageously heated to provide a fluid material of a viscosity suitable for application to one or more substrates.

In some embodiments, the moisture-reactive hot-melt composition of the present invention undergoes, in addition to reacting with water, additional chemical reactions that also desirably effect an increase in the molecular weight of the composition and/or effect crosslinking of the composition so as to improve the properties of the composition.

The moisture-reactive hot-melt composition of the present invention is said to "cure" as any of the chemical reactions that desirably effect an increase in the molecular weight of the composition and/or effect crosslinking of the composition so as to improve the properties of the composition take place. Such chemical reactions are known as "curing reactions." The composition is said to be "cured" when such reactions are complete or when the composition has been in conditions that allow curing reactions to take place and the curing reactions have progressed sufficiently far that the properties of the composition are useful and are not appreciably changing over time.

"Acrylic polymers" as defined herein are polymers formed by the polymerization of at least one (meth)acrylic monomer or a mixture of monomers that includes at least one (meth)acrylic monomer. Herein, "(meth)acrylic" means "acrylic or methacrylic"; and "(meth)acrylate" means "acrylate or methacrylate." A polymer made by polymerization of monomers is said herein to "incorporate" of each of those monomers. (Meth)acrylic monomers include, for example, (meth)acrylic acid, esters thereof, amides thereof, derivatives thereof, and mixtures thereof. (Meth)acrylic monomers include, for example, alkyl (meth)acrylate esters, aryl (meth) acrylate esters, alkaryl (meth)acrylate esters, halogenated alkyl, aryl, and alkaryl (meth)acrylate esters, other (meth) acrylate esters, N-substituted (meth)acrylamides, derivatives thereof, and mixtures thereof. Some (meth)acrylic monomers are, for example, alkyl (meth)acrylate esters wherein the alkyl group consists of a linear, branched or cyclic alkyl group with 1 to 22 carbon atoms. Acrylic polymers sometimes also incorporate one or more monomers other than (meth)acrylic monomers such as, for example, styrene, substituted styrene, vinyl acetate, diene monomers such as butadiene, or ethylene. Generally, acrylic polymers incorporate 50% or more by weight (meth)acrylic monomers, based on the weight of the acrylic polymer.

As defined herein, "Mw" is weight-average molecular weight, as measured by size exclusion chromatography.

"Crystalline" materials as defined herein are those materials with a melting peak detectable by differential scanning calorimetery (DSC) analysis. "Amorphous" materials are those that are not crystalline.

"Branched-aliphatic hydrocarbon radical," as defined herein, is a multivalent (i.e., has at least two attachment points), aliphatic hydrocarbon radical that meets one of two criteria: (1) it is a linear aliphatic hydrocarbon and at least one of the attachment points is somewhere other than the end of the linear chain; or (2) it is a branched or cyclic aliphatic hydrocarbon, and the attachment points may be anywhere on the aliphatic hydrocarbon. In some branched-aliphatic hydrocarbon radicals, all of the attachment points are on different carbon atoms; in other branched-aliphatic hydrocarbon radicals, at least one carbon atom has more than one attachment point.

"Polyol" as defined herein is a compound with two or more hydroxyl functional groups. Polyols include a wide variety of compounds, some of which are described in *Polyurethane Handbook*, $2^{nd}$ edition, edited by G. Oertel, Hanser Publishers, 1994. In addition to the hydroxyl functions, polyols may contain other functionality, such as for example carbonyl, carboxyl, anhydride, unsaturation, or other functional groups. Polyols include, for example, polyether polyols, polyester polyols, polyetherester polyols (sometimes called polyether ester polyols and/or polyester ether polyols), fatty polyols, and mixtures thereof. Some polyol(s) are crystalline; some are semi-crystalline; and others are amorphous polyols.

Polyols are sometimes characterized by their "polyol equivalent weight" and by their "nominal molecular weight." The polyol equivalent weight is defined herein according to the definition given by K. Uhlig in *Discovering Polyurethanes*, published by Hanser Publishers, Munich, 1999

(polyol equivalent weight)=56×1000/(hydroxyl number).

The nominal molecular weight of a polyol is defined as the polyol equivalent weight times the functionality of the polyol. The functionality of a polyol is the number of hydroxyl groups per molecule.

The moisture-reactive hot-melt composition is formed by a process that includes admixing ingredients that include at least one polyol. A suitable amount of polyol is 5% to 90% by weight based on the weight of the moisture-reactive hot-melt composition.

Polyester polyols are polyols, each molecule of which includes at least two ester linkages. Polyester polyols may be made from any ingredients, using any methods, as long as the result is a polyester polyol. Among the polyester polyols, for example, are those formed from diacids, or their monoester, diester, or anhydride counterparts, and diols. Polyester polyols made from diols and diacids are assumed herein to have functionality of 2. The diacids may, for example, be saturated $C_4$–$C_{12}$ aliphatic acids, including branched, unbranched, or cyclic materials; $C_8$–$C_{15}$ aromatic acids; $C_4$–$C_{18}$ arylkyl acids; $C_4$–$C_{18}$ alkaryl acids; or mixtures thereof. Diols may, for example, be $C_2$–$C_{12}$ branched, unbranched, cyclic aliphatic, or aromatic diols. In some embodiments of the present invention, the moisture-reactive hot-melt composition is formed by a process that includes admixing ingredients that include at least one crystalline polyester polyol. Suitable crystalline polyester polyols may be made by any method, using any ingredients, as long as the result is a crystalline polyester polyol. Suitable crystalline polyester polyols include, for example, those that are products of reacting a linear aliphatic diol (i.e., a diol of chemical formula HO—$(CH_2)_n$—OH, where n is 2 to 22) with a linear aliphatic diacid (i.e., a diacid of chemical formula HOOC—$(CH_2)_m$—COOH, where m is 2 to 22). In some embodiments, n is 4 or greater. In some embodiments, n is 10 or less; or 8 or less. In some embodiments, n is 6. Independently, in some embodiments, m is 10 or less; or 8 or less, or 6 or less. In some embodiments, m is 4. One suitable crystalline polyester polyol is, for example, hexane diol adipate.

In some of the embodiments that use at least one crystalline polyester polyol, one or more of the crystalline polyester polyols is made by reacting one or more linear aliphatic diols with a mixture of diacids. In some embodiments, the mixture of diacids includes at least one linear aliphtic diacid, at least one aromatic diacid, and optional other diacids. One class of such crystalline polyester polyols is made by reacting hexane diol with a mixture of adipic acid and an aromatic acid such as, for example terephthalic acid.

Some of the suitable crystalline polyester polyols include, for example, those with nominal molecular weight of 800 or more; or 1,600 or more; or 3,000 or more. Independently, some suitable crystalline polyester polyols include, for example, those with nominal molecular weight of 20,000 or less; or 10,000 or less; or 5,000 or less. Independently, some suitable crystalline polyester polyols include, for example, those with hydroxyl number of 15 mg KOH per gram or greater; or 25 mg KOH per gram or greater. Independently, some suitable crystalline polyester polyols include, for example, those with hydroxyl number of 100 mg KOH per gram or lower; or 60 mg KOH per gram or lower; or 40 mg KOH per gram or lower.

In some of the embodiments that include at least one crystalline polyester polyol, the amount of crystalline polyester polyol is 85% or less by weight, based on the weight of the moisture-reactive hot-melt composition; or 65% or less; or 50% or less; or 40% or less. Independently, in some of the embodiments that include at least one crystalline polyester polyol, the amount of crystalline polyester polyol is 5% or more by weight, based on the weight of the moisture-reactive hot-melt composition; or 10% or more; or 20% or more. Also contemplated are embodiments in which no crystalline polyester polyol is used.

In some embodiments of the present invention, the moisture-reactive hot-melt composition is formed by a process that includes admixing ingredients that include at least one amorphous polyester polyol. Suitable amorphous polyester polyols may be made by any method, using any ingredients, as long as the result is an amorphous polyester polyol. Some suitable amorphous polyester polyols are, for example, the products of reacting at least one diol with at least one diacid, where at least one diol is a branched-aliphatic diol; or at least one diacid is a branched-aliphatic diacid; or at least one diol is a branched-aliphatic diol and at least one diacid is a branched-aliphatic diacid. A "branched-aliphatic diol," as defined herein, is a compound in which two hydroxyl groups are attached to one branched-aliphatic hydrocarbon radical. A "branched-aliphatic diacid," as defined herein, is a compound in which two carboxyl groups are attached to one branched-aliphatic hydrocarbon radical.

One suitable amorphous polyester polyol is, for example, neopentyl adipate.

In some of the embodiments that include at least one amorphous polyester polyol, the amount of amorphous polyester polyol is 50% or less by weight, based on the weight of the moisture-reactive hot-melt composition; or 40% or less; or 35% or less. Independently, in some of the embodiments that include at least one amorphous polyester polyol, the amount of amorphous polyester polyol is 5% or more by weight, based on the weight of the moisture-reactive hot-melt composition; or 10% or more; or 20% or more. Also contemplated are embodiments in which no amorphous polyester polyol is used.

Some of the suitable amorphous polyester polyols include, for example, those with nominal molecular weight of 500 or greater; or 800 or greater. Independently, some of the suitable amorphous polyester polyols include, for example, those with nominal molecular weight of 5,000 or less; or 2,000 or less. Independently, some of the suitable amorphous polyester polyols include, for example, those with hydroxyl number of 50 mg KOH per gram or higher; or 75 mg KOH per gram or higher; or 100 mg KOH per gram or higher. Independently, some of the suitable amorphous polyester polyols include, for example, those with hydroxyl number of 200 mg KOH per gram or lower; or 150 mg KOH per gram or lower.

In some embodiments of the present invention, the moisture-reactive hot-melt composition is formed by a process that includes admixing ingredients that include at least one polyether polyol. A polyether polyol is a polyol that includes at least two ether linkages. Suitable polyether polyols may be made by any method, using any ingredients, as long as the result is a polyether polyol. Polyether polyols suitable for use in the present invention include, for example, polyoxy-$C_2$–$C_6$-alkylene polyols, including branched and unbranched alkylene groups. Examples of suitable polyether polyols include, for example, polyethylene glycol, polypropylene glycol, polytetramethylene glycol, random or block copolymers of these polyethers, and mixtures thereof. Mixtures of the various suitable polyether polyols are also suitable for use in the present invention. In some embodiments, at least one polyether polyol is a polypropylene glycol, also known as a polypropyleneoxide.

Some of the suitable polyether polyols include, for example, those with nominal molecular weight of 300 or more; or 800 or more; or 1500 or more. Independently, some of the suitable polyether polyols include, for example, those with nominal molecular weight of 10,000 or less; or 5,000 or less; or 1500 or less. Independently, some of the suitable polyether polyols include, for example, those with hydroxyl number of 20 or more; or 50 or more. Independently, some of the suitable polyether polyols include, for example, those with hydroxyl number 200 or less; or 125 or less; or 80 or less.

In some embodiments of the present invention, the amount of polyether polyol is 40% or less by weight, based on the weight of the moisture-reactive hot-melt composition; or 30% or less; or 20% or less; or 15% or less; or 10% or less. Independently, in some embodiments of the present invention, the amount of polyether polyol is 0.5% or more by weight, based on the weight of the moisture-reactive hot-melt composition; or 1% or more; or 2% or more; or 4% or more; or 6% or more. Also contemplated are embodiments in which no polyether polyol is used.

One useful way to characterize the moisture-reactive hot-melt compositions of the present invention is the sum of the weight of all polyether polyols plus the weight of all crystalline polyester polyols. In some embodiments, this sum is 90% or less by weight, based on the weight of the moisture-reactive hot-melt composition; or 75% or less; or 50% or less; or 40% or less; or 30% or less. In some embodiments, this sum is 5% or more by weight, based on the weight of the moisture-reactive hot-melt composition; or 10% or more; or 15% or more; or 20% or more. Also contemplated are embodiments in which this sum is 0%.

Among embodiments of the present invention in which the moisture-reactive hot-melt composition includes at least one polyether polyol and at least one crystalline polyester polyol, one useful way to characterize such compositions is the ratio (herein called the "PXP" ratio) of the weight of all polyether polyols to the weight of all crystalline polyester polyols. In some of such embodiments, the PXP ratio is 0.01 or higher; or 0.03 or higher; or 0.1 or higher; or 0.2 or higher. Independently, in some of such embodiments, the PXP ratio is 100 or lower; or 25 or lower; or 10 or lower; or 5 or lower.

In some embodiments of the present invention, the ingredients include at least one fatty polyol. "Fatty" means herein any compound that contains one or more residues of fatty acids. Fatty acids are long-chain carboxylic acids, with chain length of at least 4 carbon atoms. In embodiments of the present invention in which fatty polyols are used, some suitable fatty polyols are castor oil, other natural or synthetic polyhydroxyl oils, the products of hydroxylation of unsaturated or polyunsaturated natural oils, the polyhydroxyl products of hydrogenations of unsaturated or polyunsaturated polyhydroxyl natural oils, polyhydroxyl esters of alkyl hydroxy fatty acids, polyhydroxyl polymerized natural oils, and polyhydroxyl alkylhydroxylated amides of fatty acids. As used herein, a "polyhydroxyl" compound is a compound that is a polyol. Mixtures of suitable fatty polyols are also suitable. Among embodiments in which one or more fatty polyols are used, some embodiments use one or more of castor oil, hydroxylated soybean oil, ethoxylated castor oil, polymerized castor oil, hydroxy ethyl ricinoleate, hydroxy ethyl ricinoleamide, or mixtures thereof. In some embodiments in which a fatty polyol is used, the only fatty polyol is castor oil.

Among embodiments in which one or more fatty polyols are used, some embodiments use 20% or less fatty polyol by weight based on the weight of the moisture-reactive hot-melt composition; or 10% or less; or 5% or less, or 2.5% or less. Independently, among embodiments in which one or more fatty polyols are used, some embodiments use 0.1% fatty polyol or more by weight based on the weight of the moisture-reactive hot-melt composition; or 0.2% or more; or 0.5% or more; or 1% or more. Also contemplated are embodiments in which 0% fatty polyol is used.

The moisture-reactive hot-melt composition of the present invention is formed by a process that includes admixing ingredients that include at least one polyisocyanate, which is defined herein as a compound bearing at least two isocyanate groups. Polyisocyanates which may be used include, for example, aromatic polyisocyanates, aliphatic polyisocyanates, cycloaliphatic polyisocyanates, and combinations thereof. Some embodiments use one or more of the following polyisocyanates: 4,4'-diphenylmethane diisocyanate (also called 4,4'-methylene bisphenyl diisocyanate or 4,4'-MDI), 2,4'-diphenylmethane diisocyanate (also called 2,4'-methylene bisphenyl diisocyanate or 2,4'-MDI), and mixtures thereof. Some embodiments use "pure MDI," which is a mixture of 4,4'-MDI with 2,4'-MDI that has a ratio of 4,4'-MDI to 2,4'-MDI of approximately 98/2 by weight. Some embodiments use 4,4'-MDI as the sole polyisocyanate.

In the practice of the present invention, a suitable amount of polyisocyanate is 5% or more by weight based on the weight of the moisture-reactive hot-melt composition; or 6% or more; or 7% or more. Independently, a suitable amount of polyisocyanate is 50% or less by weight based on the weight of the moisture-reactive hot-melt composition; or 40% or less; or 30% or less; or 20% or less.

The moisture-reactive hot-melt composition of the present invention is formed by a process that includes admixing ingredients that include at least one non-reactive acrylic polymer having weight-average molecular weight of 40,000 or higher. Non-reactive acrylic polymers are acrylic polymers that have few or no reactive groups. A reactive group is a chemical group that is one of the following: acid, hydroxyl, amine, isocyanate, or thio. Acrylic polymers with a total number of reactive groups in the amount of 70 micromole of reactive groups per gram of non-reactive acrylic polymer or less are considered herein to be non-reactive; various embodiments may have 60 micromole per gram of non-reactive acrylic polymer or less; 50 micromole per gram of non-reactive acrylic polymer or less; 25 micromole per gram of non-reactive acrylic polymer or less; 10 micromole per gram of non-reactive acrylic polymer or less; or no reactive groups. In some embodiments, the non-reactive acrylic polymers that have a suitably small amount of reactive groups are polymers in which the reactive groups include carboxylic acid groups. In some embodiments, the non-reactive acrylic polymers that have a suitably small amount of reactive groups are polymers in which the reactive groups are all carboxylic acid groups.

Some suitable non-reactive acrylic polymers that have a suitably small amount of reactive groups are made by polymerizing monomers that include one or more reactive monomer. That is, such a polymer incorporates a suitably small amount of reactive monomer. Reactive monomers are those that have reactive groups (as defined herein above) that remain present on the polymer after the polymerization process. In some embodiments, the non-reactive acrylic polymer will incorporate a suitably small amount of monomer with one type of reactive group while incorporating no monomer with any of the other types of reactive groups. For example, in one embodiment, the non-reactive acrylic polymer incorporates a suitably small amount of one or more monomers that have carboxylic acid groups while incorporating no monomers that have hydroxyl, amine, or thio groups. In other embodiments, the suitable non-reactive acrylic polymer that has a suitably small amount of reactive groups may have any combination or selection of reactive groups.

Contemplated as some embodiments of the present invention are compositions formed by a process that includes admixing ingredients that include non-reactive acrylic polymers that not only have few or no reactive groups as defined herein above but also lack other chemically active groups. By "other chemically active group" is meant herein a group, other than the reactive groups defined herein above, that can undergo chemical reactions to form chemical bonds (such as, for example, ionic or covalent bonds) with an identical other chemically active group, with a different other chemically active group, with a reactive group, or with any combination thereof, under conditions normally used for curing of polymer adhesives or polymer coatings. Other chemically active groups include, for example, epoxy, carbonyl, amine, nitrate, nitrile, sulfate, similarly reactive groups, and combinations and mixtures thereof. A non-reactive acrylic polymer is said herein to "lack" a certain other chemically active group if the non-reactive acrylic polymer has none of that other chemically active group or has 70 micromole or less of that other chemically reactive group per gram of non-reactive acrylic polymer. When a non-reactive acrylic polymer is said herein to "lack" a certain other chemically active group, also contemplated are non-reactive acrylic polymers that have amounts of that certain other chemically active group per gram of non-reactive acrylic polymer of 60 micromole or less; 50 micromole or less; 25 micromole or less; 10 micromole or less; or none. Contemplated for use in the present invention are non-reactive acrylic polymers that any lack one of or any combination of other chemically active groups.

Some suitable non-reactive acrylic polymers incorporate 50% or more by weight (meth)acrylic monomers, based on the weight of the non-reactive acrylic polymer; or 75% or more; or 95% or more. Also contemplated are non-reactive acrylic polymers that incorporate 100% by weight (meth)acrylic monomers, based on the weight of the non-reactive acrylic polymer.

Some embodiments of the non-reactive acrylic polymers of the present invention are non-reactive acrylic polymers that incorporate one or more alkyl (meth)acrylate esters; such non-reactive acrylic polymers may or may not incorporate other monomers in addition to the one or more alkyl (meth)acrylate esters. Some suitable alkyl (meth)acrylate esters are those, for example, in which the alkyl group is a linear, branched or cyclic alkyl group with 1 to 22 carbon atoms; or 1 to 10 carbon atoms; or 1 to 4 carbon atoms. Also contemplated are non-reactive acrylic polymers that incorporate one or more ethylenically unsaturated acid-functional monomers. Suitable ethylenically unsaturated acid-functional monomers include, for example, acrylic acid, methacrylic acid, crotonic acid, itaconic acid, fumaric acid, maleic acid, monomethyl itaconate, monomethyl maleate, monobutyl maleate, maleic anhydride, or mixtures thereof. Some suitable non-reactive acrylic polymers incorporate, among other monomers, acrylic acid or methacrylic acid or mixtures thereof.

The non-reactive acrylic polymer of the present invention may be made by any means known in the art, including, for example, bulk polymerization, solution polymerization, suspension polymerization, or emulsion polymerization, as taught by K. J. Saunders in *Organic Polymer Chemistry*, Chapman and Hall, London, 1973. If water is used as the continuous phase of the polymerization (as in, for example, aqueous suspension or aqueous emulsion polymerizations), most or all of the water must be removed from the non-reactive acrylic polymer before the non-reactive acrylic polymer is included in the moisture-reactive composition of the present invention. If solution polymerization is used, the solvent may be any solvent that has suitable compatibility with the monomer or monomers and with the resulting polymer. Toluene is usually suitable. If any of the other ingredients of the present invention, such as for example a liquid polyol, has suitable compatibility with the acrylic monomers and the non-reactive acrylic polymer, that ingredient may be used as the polymerization solvent for the non-reactive acrylic polymer.

When the non-reactive acrylic polymer of the present invention is made by solution polymerization in a solvent that is not one of the ingredients of the present invention, the solvent may be removed, if desired, before the non-reactive acrylic polymer is added to the other ingredients of the present invention. Alternatively, the solution containing the non-reactive acrylic polymer may be added to one or more ingredients of the present invention and the solvent may be removed from the mixture, if desired, by means known in the art such as, for example, applying full or partial vacuum and/or heating; such removal may be performed before, during, or after the preparation of the compositions of the present invention.

The non-reactive acrylic polymer of the present invention may be amorphous, crystalline, or a mixture of amorphous and crystalline. In some embodiments, the non-reactive acrylic polymer includes one or more amorphous non-reactive acrylic polymer.

The amount of non-reactive acrylic polymer preferred for use in the present invention is 1 to 20% by weight, based on the weight of the reactive hot-melt composition. In some embodiments, the amount of non-reactive acrylic polymer is 2% or more by weight, based on the weight of the reactive hot-melt composition; or 5% or more; or 10% or more; or 15% or more. In some embodiments, the amount of non-reactive acrylic polymer is 18% or less by weight, based on the weight of the reactive hot-melt composition.

Some suitable non-reactive acrylic polymers include, for example, those with Mw of 40,000 or more; or 45,000 or more; or 50,000 or more. Independently, some suitable non-reactive acrylic polymers include, for example, those with Mw of 100,000 or less; or 90,000 or less; or 80,000 or less.

Some suitable non-reactive acrylic polymers include, for example, those with glass transition temperature (Tg, as measured by DSC, using the midpoint method) of 20° C. or higher; or 30° C. or higher; or 40° C. or higher; or 45° C. or higher. Independently, some suitable non-reactive acrylic polymers include, for example, those with Tg of 120° C. or lower; or 100° C. or lower; or 90° C. or lower; or 80° C. or lower.

In the practice of the present invention, in some embodiments, the admixture of ingredients contains no reactive acrylic polymer. Reactive acrylic polymers are acrylic polymers that contain more than 70 micromole of reactive groups (as defined herein above) per gram of acrylic polymer. It is contemplated that other embodiments will include small amounts of reactive acrylic polymer. Suitable are admixtures of ingredients that contain 0.5% or less by weight reactive acrylic polymer based on the weight of the moisture-reactive hot-melt composition. In some embodiments, the admixture of ingredients contains 0.2% or less by weight reactive acrylic polymer based on the weight of the moisture-reactive hot-melt composition; or 0.1% or less; or 0.05% or less.

Also contemplated in the practice of the present invention are embodiments of the moisture-reactive hot-melt composition in which the admixture of ingredients contains no (or contains a suitably small amount of) reactive acrylic polymer and also contains no (or contains a relatively small amount of) otherwise chemically active acrylic polymer. An "otherwise chemically active acrylic polymer" means an acrylic polymer that contains more than 70 micromole of other chemically active groups (as defined herein above) per gram of that acrylic polymer. A relatively small amount of otherwise chemically active acrylic polymer is considered herein to be 0.5% or less by weight based on the weight of moisture-reactive hot-melt composition. Also contemplated are the following amounts of otherwise chemically active acrylic polymer by weight based on the weight of adhesive composition: 0.2% or less; 0.1% or less; 0.05% or less; or 0%.

In some embodiments of the present invention, the admixture of ingredients contains less than 2% water by weight based on the weight of the moisture-reactive hot-melt composition; or less than 1%; or less than 0.5%; or less than 0.2%; or less than 0.1%.

The ingredients may be mixed by conventional or other means, preferably in an inert, dry atmosphere. The ingredients may be mixed together all at one time (in a "one stage" process); alternatively, some ingredients and/or portions of ingredients may be mixed together in one operation (or "stage"), with other ingredients and/or portions of ingredients added in additional stage or stages. Normally, the ingredients are heated above room temperature. The ingredients may be heated before, during, or after the process of mixing. If more than one stage of addition of ingredients is used, the mixture of one stage may or may not be heated for a time before the ingredients of the next stage are added; and the mixture may or may not be cooled before the ingredients of the next stage are added. In some embodiments, the temperature of heating is 50° C. or higher, or 100° C. or higher. Independently, in some embodiments, the temperature of heating is 180° C. or lower, or 130° C. or lower. If more than one stage is used, the temperature of each stage may be chosen independently. During any of the stages, full or partial vacuum may be applied; also nitrogen gas or other dry and/or inert gas may be used to blanket the surface of the admixture.

In one embodiment of the present invention, the moisture-reactive hot-melt composition is formed in a two stage process. In some two stage processes, the first stage involves making a first mixture of at least one crystalline polyester polyol, at least one polyether polyol, at least one polyisocyanate, and, optionally, other ingredients; the first mixture is mixed and heated; and then, in the second stage, a second mixture is formed by adding at least one amorphous polyester polyol and, optionally, other ingredients, to the first mixture. In such two stage processes, the non-reactive acrylic polymer may be added during the first stage; or it may be added during the second stage; or some of it may be added during the first stage and some during the second stage. Independently, in some two stage processes, the optional "other ingredients" in either stage may, in some embodiments, be independently chosen from one or more of the following: additional polyisocyanates, additional polyols (including, for example, fatty polyols), and additional conventional ingredients as described herein below.

Independently, in some two stage processes, the first mixture is heated to 100° C. or higher. In some two stage embodiments, the first mixture is held at the temperature of heating for 15 minutes or longer. Independently, in some two stage embodiments, the first mixture is either cooled to a temperature of 95° C. or lower or else is maintained at a temperature of 95° C. or lower before the second mixture is formed. Independently, in some two stage embodiments, the second mixture is heated to 100° C. or higher. Independently, in some two stage embodiments in which the second mixture is heated, the second mixture is maintained at the temperature of heating for 15 minutes or longer.

Also contemplated are multi-stage processes (i.e., processes performed in two or more stages) using a wide variety of orders of addition of ingredients. Also contemplated are multi-stage processes in which two or more ingredients, in any of a wide variety of combinations, are mixed together and, optionally, heated together, before addition of the resulting mixture to one or more other ingredients, to one or more portions of one or more of the same ingredients, or to a mixture thereof. It is also contemplated that, in some embodiments, any ingredient or mixture of ingredients may be held at a temperature above room temperature, optionally with stirring, and optionally under vacuum or under a blanket of inert gas (such as, for example, nitrogen).

One example of a multi-stage process in the practice of the present invention involves the following: in a first stage, mixing and heating together one or more polyols, one or more non-reactive acrylic polymers, and optional further ingredients; in a second stage, adding one or more polyisocyanates and optional further ingredients to the mixture resulting from the first stage; in a third stage, adding one or more polyols, which may be the same or different from those already in the mixture, and optional further ingredients to the mixture resulting from the second stage; optionally, in one or more further stages, adding one or more further ingredients to the mixture resulting from the previous stage.

Another example of a multi-stage process in the practice of the present invention involves the following: in a first stage, mixing and heating together one or more polyols, one or more non-reactive acrylic polymers, and optional further ingredients; in a second stage, adding one or more polyisocyanates and optional further ingredients to the mixture resulting from the first stage; in a third stage, adding one or more polyols, which may be the same or different from polyols added in any previous stage, and optional further ingredients to the mixture resulting from the second stage; in a fourth stage, adding one or more polyisocyanates, which may be the same or different from the polyisocyantes added in any previous stage, and optional further ingredients to the mixture resulting from the third stage; optionally, in one or more further stages, adding one or more further ingredients to the mixture resulting from previous the previous stage.

During the mixing and/or heating of the ingredients of the present invention, the non-reactive acrylic polymer may be added to any of the stages. In one embodiment, a solution of the non-reactive acrylic polymer is added to one or more polyether polyols, and the mixture is heated under vacuum; other ingredients are then added in one or more stages.

In some embodiments in which one or more solid materials are added to the admixture, such solid materials may be solubilized by heating and mixing with at least one of the non-isocyanate containing ingredients before being admixed with the polyisocyanate.

In addition, a catalyst such as, for example, a tertiary amine or a tin-based catalyst or a mixture thereof may optionally be admixed with the ingredients, either before, during, or after any one or more of the stages of mixing the ingredients. In some cases, such a catalyst is believed to facilitate one or more chemical reactions between isocyanate groups and hydroxyl groups; such catalysts are sometimes used with the intention of facilitating the formation of polymer chains that incorporate polyisocyanates and polyols. Independently, in some cases, such a catalyst is believed to facilitate one or more chemical reactions between isocyanate groups and urethane linkages (either instead of, or in addition to, facilitating reactions between isocyanate groups and hydroxyl groups); such catalysts are sometimes used with the intention of facilitating the formation of crosslinks in urethane polymers. When such an optional catalyst is used, the usual use level is less than 0.3% by weight based on the weight of the moisture-reactive hot-melt composition.

The moisture-reactive hot-melt composition may be formulated by admixing additional conventional ingredients such as fillers, pigments, tackifiers, plasticizers, rheology modifiers, polymers (including, for example, thermoplastic resins other than those discussed herein above), dehydrating agents (including, for example, silanes), benzoyl chloride, other polyols (including, for example, fatty polyols), ultra-violet indicators, etc. If such additional conventional ingredients are used, they are chosen and used with due regard to the reactivity of the NCO-functional groups (i.e., the isocyanate groups), which is desirably maintained. If such additional conventional ingredients are used, they may be added, individually or in any combination, to the admixture before the other ingredients, after the other ingredients, or during any stage or combination of stages of the formation of the moisture-reactive hot-melt composition.

Independently of the above-mentioned conventional ingredients, in some embodiments, the hot-melt composition of the present invention includes a cure-catalyst to enhance the reaction of isocyanate and water during cure. Some compounds believed to be useful cure-catalysts include, for example, certain diamines (such as, for example, triethylene diamine) and certain tertiary amine ethers (such as, for example, bis(2-dimethylaminoethyl) ether and dimorpholinodiethyl ether). One suitable cure-catalyst is dimorpholinodiethyl ether. If such a cure-catalyst is used, it may be added to the admixture before the other ingredients, after the other ingredients, or during any stage or combination of stages of the formation of the admixture. In some multi-stage embodiments, dimorpholinodiethyl ether is added during the final stage.

In some embodiments in which a cure-catalyst is used, the amount of cure-catalyst is 0.005% or more by weight based on the weight of the moisture-reactive hot-melt composition; or 0.01% or more; or 0.02% or more; or 0.03% or more. Independently, in some embodiments in which a cure-catalyst is used, the amount of cure-catalyst is 0.3% or less by weight based on the weight of the moisture-reactive hot-melt composition; or 0.1% or less; or 0.08% or less; or 0.06% or less.

The moisture-reactive hot-melt composition of this invention, which is an NCO-functional composition, is stored, preferably under an inert, dry atmosphere until use.

In some embodiments of the present invention, the moisture-reactive hot-melt composition is heated in order to achieve a viscosity suitable for transporting the moisture-reactive hot-melt composition, such as by pumping or gravity feed, to the application equipment and for the application of the moisture-reactive hot-melt composition to a first substrate in the presence of moisture. The temperature should be high enough to achieve a suitable viscosity but low enough to avoid excessive degradation or other undesirable effects on the adhesive. Typical useful temperatures are in the range of 40° C. to 160° C., or 50° C. to 150° C.

In embodiments that involve application of the moisture-reactive hot-melt composition of the present invention to at least one substrate, the application may be effected by conventional means such as, for example, heated spray applicator, heated bead applicator, heated nozzle, heater doctor blade, extrusion, or heated roll coater, to form a continuous or discontinuous film of adhesive, as desired. The moisture-reactive hot-melt composition may alternatively or additionally be applied to the substrate by hand, for example with a hand-held tool such as, for example, a spatula, hand-held metering device, or other applicator. The moisture-reactive hot-melt composition may typically be applied at a level of 50 to 250 g/m$^2$ (4–20 g/ft$^2$) although in cases where one of the substrates is a fabric, it may be applied at a level as low as 1–50 g/m$^2$.

In some embodiments, the moisture-reactive hot-melt composition of the present invention is used as an adhesive to bond a first substrate to at least one subsequent substrate. In such embodiments, the moisture-reactive hot-melt composition is applied to a first substrate, and, subsequently or simultaneously, the applied moisture-reactive hot-melt composition is contacted by at least one subsequent substrate to provide a composite construction. Preferably, the moisture-reactive hot-melt composition is contacted by the second substrate while the moisture-reactive hot-melt composition has a temperature substantially above room temperature.

In some of the embodiments in which the moisture-reactive hot-melt composition of the present invention is used as an adhesive to bond a first substrate to at least one subsequent substrate, the composite construction so formed is optionally subjected to applied pressure such as by passing rollers over it to effect increased contact of the substrates with the moisture-reactive hot-melt composition. If such optional pressure is applied, it may be applied for a relatively short duration or for a relatively long duration; and it may be constant, increasing, decreasing, or a combination thereof. If the composite construction is at temperature above room temperature, it is then cooled or allowed to cool. If optional pressure is applied, cooling may take place during application of the pressure, after application of the pressure, or a combination thereof. In another embodiment, the moisture-reactive hot-melt composition may be simultaneously or sequentially applied to two surfaces of the first substrate, which moisture-reactive hot-melt composition-coated surfaces are then simultaneously or sequentially bonded to two or more further substrates, which may be the same or different. It is further contemplated that the composite construction may subsequently be bonded to other substrate(s) using the same or a different moisture-reactive hot-melt composition or using one or more other adhesives before or after the process described herein.

It is contemplated that the moisture, i.e., water, which is anticipated to effect reaction with the NCO-functional groups thereby increasing the ultimate cohesive strength of the applied moisture-reactive hot-melt composition, may be exposed to the moisture-reactive hot-melt composition of the present invention in any of a variety of ways. For example, after the moisture-reactive hot-melt composition is applied to one substrate but before it is contacted with a subsequent substrate, the moisture-reactive hot-melt composition may be exposed to moisture in any of a variety of ways, including, for example, ambient humidity, artificially increased or controlled humidified air, a mist of water droplets, a spray of liquid water contacting the applied moisture-reactive hot-melt composition, or combinations thereof. Alternatively or additionally, after a subsequent substrate is contacted with the moisture-reactive hot-melt composition, the composite construction of substrates and hot-melt composition may be exposed to moisture in any or all of the above ways. The method of exposing the composite construction to moisture is especially useful when one or more of the substrates is a material that is permeable to water vapor, such as, for example, wood, paper, or textile.

It is further contemplated that the cure process may be augmented by ingredients in addition to water that participate in, catalyze, or otherwise facilitate the reactions of NCO functional groups with each other. Such an ingredient may be combined with the moisture during any or all or the curing process. Examples of such ingredients are certain amines, which are known to link NCO functional groups together. In some cases, such amines react with NCO functional groups to form urea-type linkages (such as, for example, asymmetrical urea linkages); such urea-type linkages, in some cases, react with further NCO functional groups to form biuret linkages, for example as described by Uhlig. Regardless of mechanism, the use of such ingredients to augment the moisture cure reaction is contemplated in some embodiments of the present invention.

In some embodiments of the present invention, the moisture-reactive hot-melt composition of the present invention is applied to, or otherwise contacted to, one or more substrates. Some suitable substrates include, for example, wood, metal, plastics, composite materials, fabric (including woven and non-woven), paper, and combinations thereof. Suitable substrates include, for example, natural wood, plywood, lauan wood, particle board, oriented strand board, rigid plastic, flexible plastic, plastic films, plastic foams, and combinations thereof. If more than one substrate is used, any combination of suitable substrates is also suitable. In some embodiments, all the substrates will be made of the same material; in other embodiments, two or more different materials will be used as substrates.

Another desirable characteristic of moisture-reactive hot-melt compositions in addition to low cobwebbing is green strength. When the moisture-reactive hot-melt composition is used to bond two substrates together, green strength is the bond strength prior to completion of the reaction with moisture.

It is to be understood that for purposes of the present specification and claims that the range and ratio limits recited herein can be combined. For example, if ranges of 60 to 120 and 80 to 110 are recited for a particular parameter, it is understood that the ranges of 60 to 110 and 80 to 120 are also contemplated. Independently, if minimum values for a particular parameter are recited, for example, to be 1, 2, and 3, and if maximum values for that parameter are recited to be, for example, 8 and 9, then the following ranges are all contemplated: 1 to 8, 1 to 9, 2 to 8, 2 to 9, 3 to 8, and 3 to 9.

EXAMPLES

In the following examples, the following abbreviations and ingredients were used:

| | |
|---|---|
| OH# = | Hydroxyl Number, reported in grams of KOH per gram of material; hydroxyl numbers are approximate |
| HDA = | hexane diol adipate |
| HDAT = | polyester of hexane diol with mixture of adipic acid and terephthalic acid |
| NPGA = | neopentyl glycol adipate |
| DMDEE = | dimorpholinodiethyl ether, also called 2,2' dimorpholinoethyl ether |
| NMW = | nominal molecular weight; values are approximate |

| Ingredient | Description | Supplier |
|---|---|---|
| Desmophen™ S 105-30 | HDA, OH# 32 | Bayer Polymers |
| Desmophen™ S 107-110 | NPGA, OH# 109 | Bayer Polymers |
| Pluracol™ P2010 | polyether polyol, NMW 2000, OH# 56 | BASF Corporation |
| Arcol™ PPG 1025 | polyether polyol, NMW 1000, OH# 110 | Bayer Polymers |
| Irganox™ 245 | phenolic antioxidant | Ciba Specialty Chemicals |
| Silquest™ A-171 | silane | OSi Specialties |
| Paraloid™ B60 | acrylic polymer | Rohm and Haas Co. |
| Dynacoll™ 7345 | HDAT, OH# 30 | Creanova |
| Blankophor™ SOL | ultraviolet indicator | Bayer Chemicals |

Green Strength Test:

In the following Examples, some materials were tested for green strength using the following procedure:

First, wooden blocks were prepared. A 50.8 mm (2 inch) by 50.8 mm (2 inch) plywood block, 12.7 mm (0.5 inch) thick, was laminated to the center of a second plywood block, which was 50.8 mm (2 inch) by 76.2 mm (3 inch), 12.7 mm (0.5 inch) thick, so that there was a 12.7 mm (0.5 inch) overhang at both ends of wooden block for inserting into the jaws of the tensile testing machine. Any thermoset wood adhesive could be used for preparing the wooden blocks. For this work, a two-component epoxy adhesive was used. Blocks were cured for at least 2 days.

Material to be tested was run on a heated rollcoater with oil temperature setting at 143° C. (290° F.). The coater was adjusted to give coverage of approximately 130 g/m² (12 grams per sq. ft). Three of the prepared wooden blocks were put in the center area of any suitable carrier board in such a way that the smaller block (i.e., the one 50.8 mm by 50.8 mm) was facing up.

Board was then coated with the material to be tested, and as soon as it was coated, a stop watch was started for timing. Immediately these coated blocks were bonded with another set of wooden blocks and then immediately pressed in a press for 3 to 4 seconds, and tensile strength was tested on an Instron™ tensile testing machine after 1, 3, and 6 minutes. Separation speed during this test was 0.12 mm/s (0.05 inch per minute).

Cobwebbing Test:

In the following examples, materials were tested for cobwebbing with the following procedure:

Material to be tested was run on a heated rollcoater with oil temperature setting at 143° C. (290° F.). The coater was adjusted to give coverage of approximately 130 g/m² (12 grams per sq. ft). A plywood substrate was passed through the roll coater, and the coated substrate was observed after it exited the roll coater. The coated substrate was examined for the presence of thin strands of coated material extending from the surface of the coated substrate, and the assessment was made as follows:

"high cobwebbing"=many thin strands are present, enough to require unusual measures to deal with the strands when handling the coated substrate.

"low cobwebbing"=no visible strands; or so few strands that no unusual measures are required to account for the presence of the strands when handling the coated substrate.

Example 1

Desmophen™ S105P-30 and S107–110 were kept heated in separate containers at 90° C. for 72 hours prior to running the batch.

The reactor was heated to 150° C. While heating the dry reactor, 311 g Desmophen™ S 105-30, 74.2 g Pluracol™ P-2010, 19.8 g DB Castor oil, 0.3 g Irganox™ 245, and 2.4 g Silquest™ A-171 were loaded into the reactor. While mixing at moderate to high speed 173 g of Paraloid™ B-60 acrylic resin was added very slowly to avoid lump formation. While mixing, reactor was heated to 150° C. under a nitrogen atmosphere. Once at 150° C., reactor was held for 2 hours with good agitation to dissolve the Paraloid™ B-60.

After the Paraloid™ B-60 was dissolved, the reactor was cooled to about 120° C. Then slowly full vacuum was applied and then held for 30 minutes while cooling the batch to 90–92° C.

The vacuum was broken with nitrogen, and 166.5 g of pure MDI was added rapidly once batch was cooled to 90–92° C. If an exotherm was observed, cooling was applied. Then the reactor was held at 100 to 105° C. for 60 minutes under moderate vacuum to get rid of bubbles in the melt, with reduced agitation speed if necessary in order to avoid air entrapment.

Near the end of 60 minutes hold, the kettle was cooled to 90 to 95° C. 279.5 g of Desmophen™ S 107–110 was quickly loaded and reacted at 100 to 105° C. for 30 minutes. If an exotherm was observed, cooling was applied. During this period agitation speed was reduced and vacuum was applied to get rid of air bubbles from the melt.

After 30 minutes hold, 0.1 g of benzoyl chloride and 0.5 g of DMDEE were loaded, and the reactor was held at 100 to 105° C. for an additional 30 minutes under vacuum to get rid of air bubbles. The batch was discharged through a heated screen filter and purged with nitrogen.

Comparative A

Using the methods of Example 1, a comparative formulation is made with the following ingredients. The amounts shown are percentage by weight, based on the weight of the formulation.

| Ingredient | % |
|---|---|
| Desmophen™ S105-30 | 00.0 |
| Pluracol™ P2010 | 27.3 |
| Castor Oil | 2.2 |
| Irganox™ 245 | 0.03 |
| Silquest™ A-171 | 0.0 |
| Paraloid™ B60 | 22.0 |
| pure MDI | 18.2 |
| Desmophen™ S107-110 | 30.3 |
| benzoyl chloride | 0.0 |
| DMDEE | 0.06 |

Examples 2–7

Using the method of Example 1, the following Examples were prepared. The amounts shown are percentage by weight, based on the weight of the formulation.

| | Example Number | | | | | |
|---|---|---|---|---|---|---|
| Ingredients | 2 | 3 | 4 | 5 | 6 | 7 |
| Desmophen™ S 105-30 | 13.87% | 21.63% | 6.42% | 30.74% | 0.00% | 41.17% |
| Pluracol™ P-2010 | 20.81% | 14.41% | 25.66% | 7.69% | 30.40% | 0.00% |
| Castor oil | 1.78% | 1.85% | 1.65% | 1.98% | 1.56% | 2.12% |
| Irganox™ 245 | 0.03% | 0.03% | 0.03% | 0.03% | 0.03% | 0.03% |
| Silquest™ A-171 | 0.22% | 0.22% | 0.20% | 0.23% | 0.19% | 0.26% |
| Paraloid™ B-60 | 15.58% | 17.35% | 17.36% | 17.29% | 17.37% | 17.21% |
| pure MDI | 17.78% | 16.59% | 18.15% | 15.66% | 18.80% | 14.61% |
| Desmophen™ S 107-110 | 29.87% | 27.86% | 30.47% | 26.32% | 31.59% | 24.54% |
| Benzoyl chloride | 0.01% | 0.01% | 0.01% | 0.01% | 0.01% | 0.01% |
| DMDEE | 0.05% | 0.05% | 0.05% | 0.05% | 0.05% | 0.05% |

Example 8 and Comparative B: Green Strength Measurements

Using the test for green strength measurement defined herein above, the following results were obtained:

| | | Green Strength, kPa (psi) | | |
|---|---|---|---|---|
| Example No. | Material | at 1 min. | at 3 min. | at 6 min. |
| Comparative B | Comparative A | 9.6 (3.1) | 34 (5.0) | 41 (6.0) |
| Example 8 | Example 1 | 16 (2.4) | 511 (74) | 560 (81)[note] |

[note]in the test at 6 minutes on Example 8, the wood failed. Thus the adhesion strength between the coated material and the substrate was at least 560 kPa and possibly greater than 560 kPa.

Examples 9–15 and Comparative C

Using the method described herein above, the cobwebbing of various materials was assessed. The results were as follows:

| Example | Material | Cobwebbing |
| --- | --- | --- |
| Comparative C | Comparative A | high |
| Example 9 | Example 1 | low |
| Example 10 | Example 2 | low |
| Example 11 | Example 3 | low |
| Example 12 | Example 4 | low |
| Example 13 | Example 5 | low |
| Example 14 | Example 6 | low |
| Example 15 | Example 7 | low |

Example 16

Desmophen™ 105–30, Desmophen™ 105–110 and Dynacoll™ 7345 kept in separate containers in a heated box at 90° C. for 72 hours prior to use. During the following procedure, the reactor was purged with nitrogen while ingredients were being added to the reactor.

The reactor was heated to 150° C. While heating the dry reactor, 37.4 kg (82.3 lbs) Desmophen™ S 105–110, 37.4 kg (82.3 lbs) Arcol™ PPG 1025, and 136 g (0.30 lbs) Irganox™ 245 were loaded. While mixing at moderate to high speed, 57.7 kg (127.1 lbs) Paraloid™ B-60 was added very slowly to avoid lump formation. While mixing the contents, reactor was heated to 150° C. under a nitrogen atmosphere. Once at 150° C., the reactor was held for 2 hours with good agitation to dissolve the Paraloid™ B-60.

After the Paraloid™ B-60 is dissolved, the batch was cooled to about 120° C. Then full vacuum was slowly applied and held for 30 minutes, while the batch was cooled to 90–92° C.

The vacuum was broken with nitrogen, and 12.9 kg (28.4 lbs) pure MDI was added as rapidly as possible once batch was cooled to 90–92° C. If an exotherm occurred, cooling was applied to maintain temperature of 100 to 105° C., which was held for 60 minutes under moderate vacuum to get rid of air bubbles in the melt. Agitation speed was reduced if necessary in order to avoid air entrapment.

953 g (2.10 lbs) Silquest™ A-171, 196.2 kg (432.1 lbs) Desmophen™ S 105-30, and 65.4 kg (144.1 lbs) Dynacoll™ 7345 were loaded. Again, strong vacuum was applied, and held at 100–105° C. for 30 minutes. Vacuum was broken with nitrogen, and the reactor was cooled to 90–92° C.

45.6 kg (100.41 lbs) pure MDI was loaded. Reactor was held at 100 to 105° C. for 60 minutes. Cooling was applied if necessary to maintain the temperature. During this period, mixing speed was reduced, and vacuum was applied to get rid of bubbles in the melt.

Vacuum was broken with nitrogen, and 45 g (0.10 lbs) benzoyl chloride, 272 g (0.60 lbs) DMDEE, and 91 g (0.20 lbs) Blankophor™ SOL were added to the reactor. Reactor was then mixed for 30 minutes under vacuum to get rid of bubbles. Temperature was maintained at 100 to 105° C. Batch was discharged through heated screen filter and purged with nitrogen.

The resulting product was tested using the cobwebbing test method described herein above, the cobwebbing was found to be low.

I claim:

1. A moisture-reactive hot-melt composition formed by a process comprising mixing ingredients comprising
    (a) 5% to 90% by weight at least one polyol, based on the weight of said composition;
    (b) 1% to 20% by weight at least one non-reactive acrylic polymer having weight-average molecular weight of 40,000 or higher, based on the weight of said composition; and
    (c) 5% to 50% by weight at least one polyisocyanate, based on the weight of said composition.

2. The composition of claim 1, wherein said composition has low cobwebbing.

3. The composition of claim 1 wherein said ingredient (a) comprises
    (a)(i) 0% to 85% by weight at least one crystalline polyester polyol, based on the weight of said composition;
    (a)(ii) 0% to 15% by weight at least one polyether polyol, based on the weight of said composition; and
    (a)(iii) 5% to 50% by weight at least one amorphous polyester polyol, based on the weight of said composition;
and wherein the sum of the amounts of said ingredients (a)(i) and (a)(ii) is 10% to 90% by weight, based on the weight of said composition.

4. The composition of claim 3 wherein said ingredient (a)(i) comprises at least one crystalline polyester polyol that is the product of reacting a linear aliphatic diol and a linear aliphatic diacid.

5. The composition of claim 3 wherein the amount of said ingredient (a)(i) is 20% to 40% by weight based on the weight of said composition.

6. The composition of claim 3 wherein the amount of said ingredient (a)(ii) is 5% to 10% by weight based on the weight of said composition.

7. The composition of claim 3 wherein said process comprises the operations of
    (A) heating a first mixture comprising said ingredients (a)(i), (a)(ii), and (c) to 100° C. or higher for 15 minutes or more;
    (B) cooling said first mixture to 95° C. or less;
    (C) forming a second mixture by adding said ingredient (a)(iii) to said first mixture; and
    (D) heating said second mixture to 100° C. or higher for 15 minutes or more;
wherein said ingredient (b) may be added before, during, or after any of said operations (A), (B), (C), (D), or combination thereof.

8. A process comprising mixing ingredients comprising
    (a) 5% to 90% by weight at least one polyol, based on the weight of said composition;
    (b) 1% to 20% by weight at least one non-reactive acrylic polymer having weight-average molecular weight of 40,000 or higher, based on the weight of said composition; and
    (c) 5% to 50% by weight at least one polyisocyanate, based on the weight of said composition.
wherein at least one product of said process is a moisture-reactive hot-melt composition.

9. The process of claim 8, wherein said at least one product of said process is a moisture-reactive, hot-melt composition that has low cobwebbing.

10. A composite construction formed by a process comprising
    (I) applying a film of the composition of claim 1 to a first substrate, and
    (II) contacting at least one subsequent substrate to said film.

* * * * *